(12) United States Patent
Daniels

(10) Patent No.: US 9,970,554 B2
(45) Date of Patent: *May 15, 2018

(54) SHUTTER VALVE

(71) Applicant: Clarke Industrial Engineering, Inc., North Kingstown, RI (US)

(72) Inventor: Kyle P. Daniels, Coral Gables, FL (US)

(73) Assignee: Clarke Industrial Engineering, Inc., North Kingstown, RI (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/392,663

(22) Filed: Dec. 28, 2016

(65) Prior Publication Data

US 2017/0175903 A1      Jun. 22, 2017

Related U.S. Application Data

(63) Continuation of application No. 14/634,002, filed on Feb. 27, 2015, now Pat. No. 9,568,111, which is a continuation of application No. 14/454,265, filed on Aug. 7, 2014.

(60) Provisional application No. 61/863,179, filed on Aug. 7, 2013.

(51) Int. Cl.
| | |
|---|---|
| *F16K 3/03* | (2006.01) |
| *F16K 31/53* | (2006.01) |
| *F16K 3/02* | (2006.01) |

(52) U.S. Cl.
CPC .............. *F16K 3/03* (2013.01); *F16K 3/0227* (2013.01); *F16K 31/53* (2013.01)

(58) Field of Classification Search
CPC . F16K 3/03; F16K 3/18; F16K 3/0227; F16K 31/535; F16K 1/42

USPC ........................................................ 251/212
See application file for complete search history.

(56) References Cited

U.S. PATENT DOCUMENTS

| | | |
|---|---|---|
| 1,343,477 A | 6/1920 | March |
| 1,595,300 A | 8/1926 | Halloran |
| 1,999,699 A | 4/1935 | Robert |
| 2,043,337 A | 6/1936 | Smith |
| 2,229,231 A | 1/1941 | Weyenberg |
| 2,307,273 A | 1/1943 | Hughes |
| 2,830,617 A | 4/1958 | Brown |
| 3,101,736 A | 8/1963 | Egger |

(Continued)

FOREIGN PATENT DOCUMENTS

| | | |
|---|---|---|
| FR | 1147940 A | 12/1957 |
| GB | 579471 A | 8/1946 |

*Primary Examiner* — Matthew W Jellett
(74) *Attorney, Agent, or Firm* — Morris, Manning & Martin, LLP; Daniel E. Sineway; Bryan D. Stewart

(57) ABSTRACT

A shutter valve for regulating pressure and controlling fluid flow comprising an actuator ring having a plurality of gear teeth, the gear teeth driven by a mating gear or other means. A plurality of obturator pin bosses, each pin boss affixed within an inside circumference of the actuator ring, the pin boss further comprising a hinge pin aperture. The shutter valve further comprises three or more obturator elements, each obturator element defining a petal shape structure including a tongue and groove feature along at least a portion of an outside circumference thereof, and wherein each obturator element is hingedly coupled to a hinge pin aperture of an obturator pin boss. A hook element is located at an apex of said petal shape structure of each obturator element. The shutter value further includes a housing defining a cavity or holding the actuator ring and the three or more obturator elements.

20 Claims, 9 Drawing Sheets

(56) References Cited

U.S. PATENT DOCUMENTS

| | | |
|---|---|---|
| 3,329,396 A | 7/1967 | Heaton et al. |
| 3,673,925 A | 7/1972 | Davies |
| 3,685,923 A | 8/1972 | Hutchins et al. |
| 3,787,022 A | 1/1974 | Wilcox |
| 4,094,492 A | 6/1978 | Beeman et al. |
| 4,232,595 A | 11/1980 | Cox |
| 4,443,161 A | 4/1984 | Masuda et al. |
| 4,811,182 A | 3/1989 | Solomon |
| 4,882,977 A | 11/1989 | Himeno et al. |
| 4,893,225 A | 1/1990 | Solomon |
| 5,647,737 A | 7/1997 | Gardner et al. |
| 5,662,309 A | 9/1997 | Guzorek |
| 5,806,725 A | 9/1998 | Bennett |
| 5,954,089 A | 9/1999 | Seymour |
| 6,375,155 B1 | 4/2002 | Janssens |
| 6,605,176 B2 | 8/2003 | Tzu |
| 6,631,716 B1 | 10/2003 | Robinson et al. |
| 6,896,240 B2 | 5/2005 | Wijaya |
| 7,255,012 B2 | 8/2007 | Hedtke |
| 7,819,728 B2 | 10/2010 | Beckley |
| 8,056,466 B2 | 11/2011 | Bravo et al. |
| 8,132,783 B2 | 3/2012 | Luebbers |
| 8,196,610 B2 | 6/2012 | Murakami et al. |
| 8,215,613 B2 | 7/2012 | Cheung |
| 8,316,820 B1 | 11/2012 | Cammarata |
| 8,430,140 B2 | 4/2013 | Ognjanovski et al. |
| 8,443,713 B2 | 5/2013 | Ogawa et al. |
| 8,833,388 B2 | 9/2014 | Eto et al. |
| 8,910,920 B1 | 12/2014 | Daniels |
| 9,206,911 B1 | 12/2015 | Daniels |
| 2005/0226747 A1 | 10/2005 | Ohashi et al. |
| 2006/0201273 A1 | 9/2006 | Beckley |
| 2006/0261303 A1 | 11/2006 | Thomas et al. |
| 2009/0025416 A1 | 1/2009 | Murakami et al. |
| 2009/0065081 A1 | 3/2009 | Luebbers |
| 2009/0095350 A1 | 4/2009 | Bauman et al. |
| 2009/0114861 A1 | 5/2009 | Luebbers et al. |
| 2011/0064588 A1 | 3/2011 | Mack et al. |
| 2011/0108126 A1 | 5/2011 | Monkowski et al. |
| 2011/0186758 A1 | 8/2011 | Goldbeck et al. |
| 2013/0037126 A1 | 2/2013 | Horng |
| 2014/0054157 A1 | 2/2014 | Krebber et al. |
| 2014/0124061 A1 | 5/2014 | Daniels |
| 2015/0041695 A1 | 2/2015 | Daniels |
| 2015/0300525 A1 | 10/2015 | Lin |

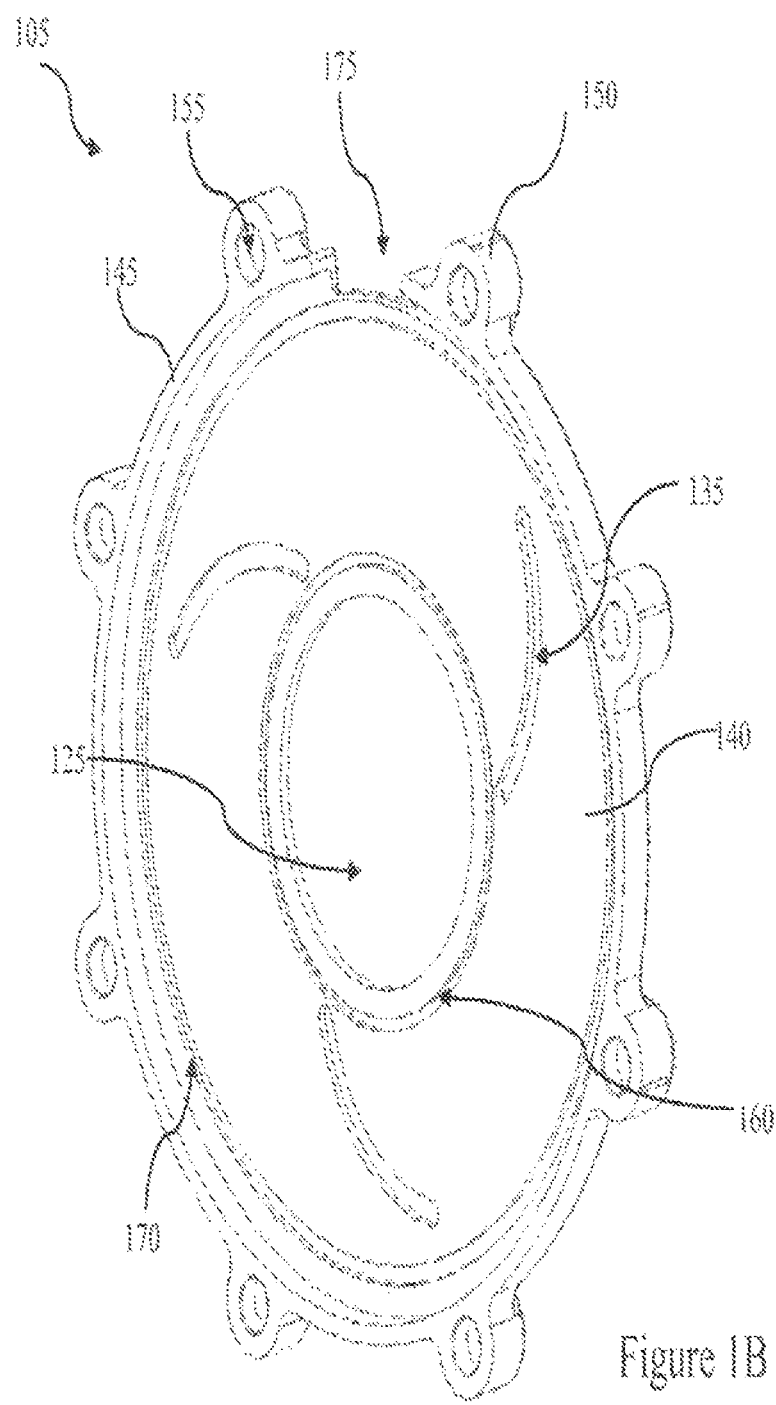

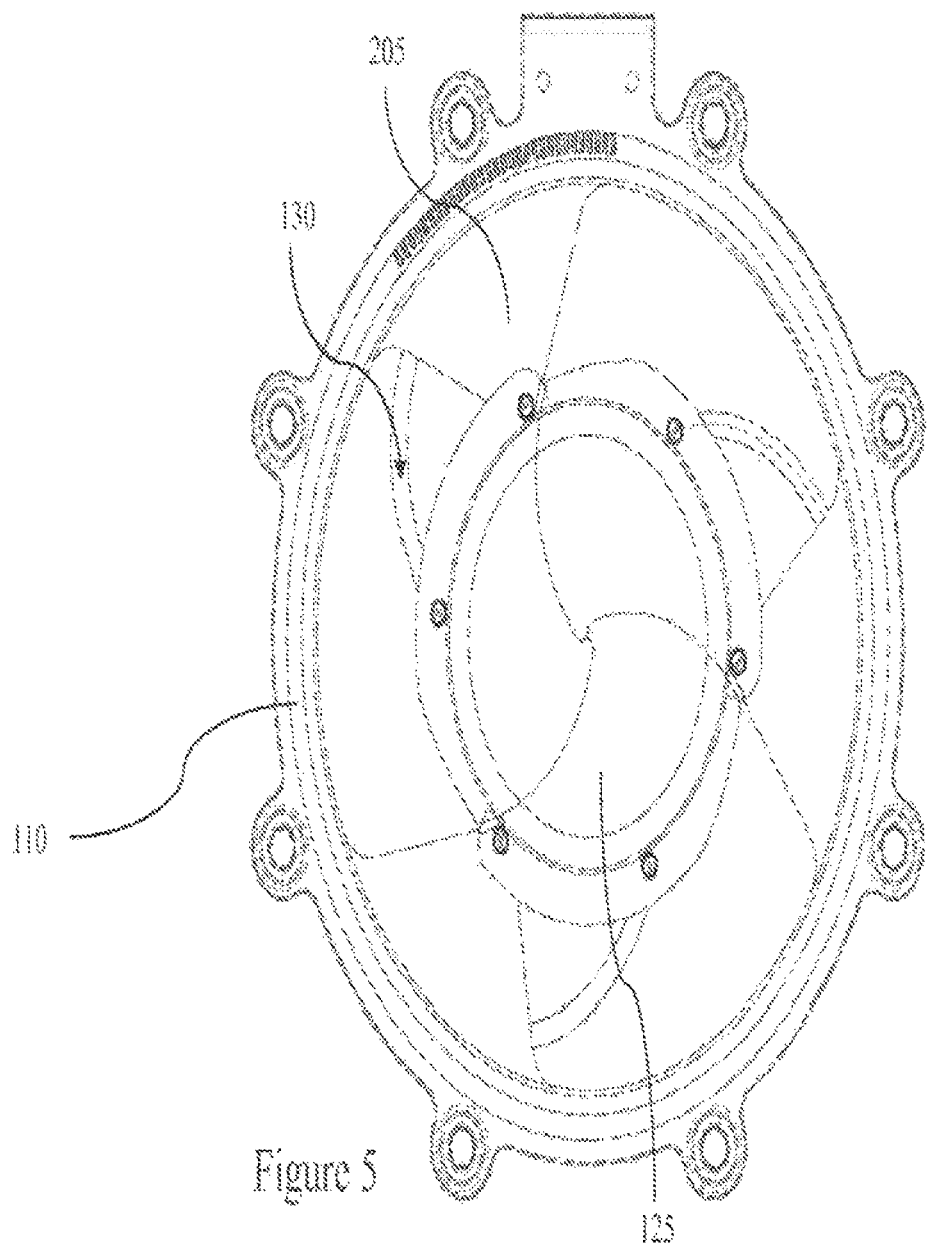

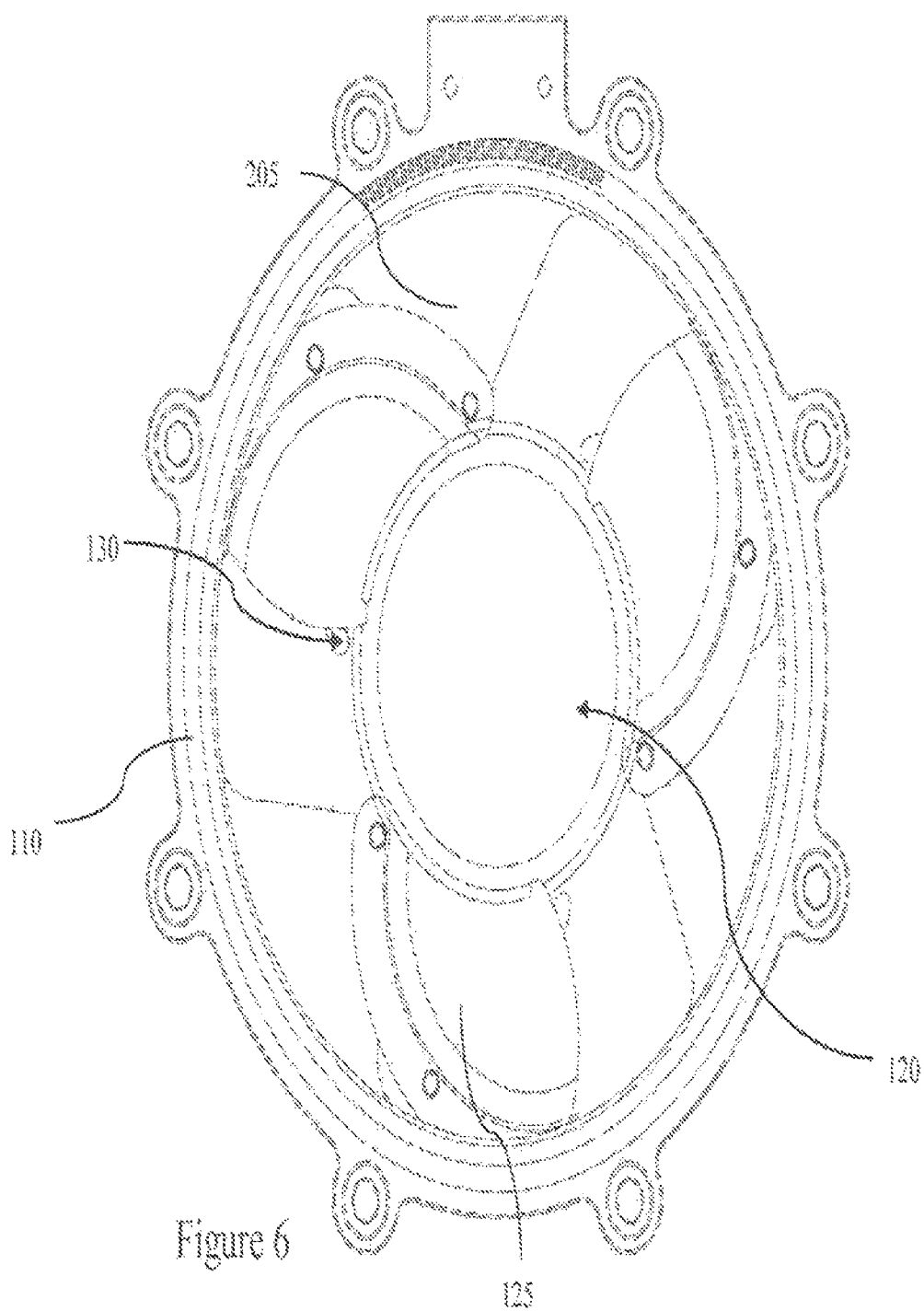

SHUTTER VALVE

CROSS-REFERENCE TO RELATED APPLICATIONS

This patent application is a continuation of and claims the benefit of and priority to U.S. Non-Provisional patent application Ser. No. 14/634,002, filed Feb. 27, 2015, and entitled "Shutter Valve," which is a continuation of U.S. Non-Provisional application Ser. No. 14/454,265 filed Aug. 7, 2014 and entitled "Shutter Valve" which claims priority to provisional patent application No. 61/863,179 filed Aug. 7, 2013 and entitled "Shutter Valve." The subject matters of which are hereby incorporated by reference in their entireties.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of valve systems, and more particularly relates to the field of shutter valves for pressure regulation and the control of fluids in machines.

BACKGROUND OF THE INVENTION

One of the problems with conventional valves is the lack of the ability to regulate the amount of fluid flow through the valve. This is because most conventional valves typically only offer an on and off position. Completely stopping fluid flow, i.e., turning the valve to the off position, results in a steep pressure drop, which can cause a shockwave in the system and can result in cavitation. This can reduce the lifespan of the valve, as well as the system as a whole. Another problem with conventional valves is the lack of the ability to remain securely sealed in a pressurized system. This insecurity in said processes can cause leakage. Yet another common problem with conventional valves is that the obturator element remains within the lumen of the flow of gas or liquid, as with a butterfly valve, thereby interrupting fluid flow. This approach, however, creates a disruption in the fluid flow and can cause potential currents that can produce cavitation. This negative result can also directly reduce the life span of a valve, pipe, or the entire system altogether.

One possible approach to the above-described problems is the use of an iris valve, which utilizes obturator elements within the lumen of the flow area, wherein the obturator elements open and close in an annular array to regulate the flow of gases or liquids. This removes all obstructions to the flow of gases and liquids when the valve is in the open position. But conventional iris valves also possess the same problem with remaining securely sealed, especially in a pressurized system. Thus, many conventional iris valves suffer from leakage caused by the inability to seal properly. The inability of conventional iris valves to seal properly has limited the uses and useful life span of the iris valve. In many cases, various industries have not used iris valves because of this problem.

Consequently, a need exists to overcome the problems with the prior art as discussed above, and particularly for a more efficient valve that seals properly.

SUMMARY OF THE INVENTION

Briefly, according to an embodiment of the present invention, disclosed is a shutter valve for regulating pressure and controlling fluid flow comprising an actuator ring having a plurality of gear teeth, the gear teeth driven by a mating gear or other means. The shutter valve includes a plurality of obturator pin bosses. Each pin boss is affixed within an inside circumference of the actuator ring, the obturator pin boss further comprising a hinge pin aperture. The shutter valve further comprises three or more obturator elements, each obturator element defining a petal shape structure including a tongue and groove feature along at least a portion of an outside circumference thereof. Each obturator element is hingedly coupled to a hinge pin aperture of an obturator pin boss. Each obturator element further includes a hook element located at an apex of said petal shape structure of each obturator element. The shutter value further includes a housing defining a cavity for holding the actuator ring and the three or more obturator elements.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the disclosed embodiments will be apparent from the following detailed description taken in conjunction with the accompanying drawings. Additionally, the left-most digit of a reference number identifies the drawing in which the reference number first appears.

FIG. 1B is a perspective view of the first part of the shutter valve housing, in accordance with one embodiment.

FIG. 5 is frontal view of the assembled shutter valve without the first part of the housing, shown in the closed position, in accordance with one embodiment.

FIG. 6 is frontal view of the assembled shutter valve without the first part of the housing, shown in the open position, in accordance with one embodiment.

DETAILED DESCRIPTION

Figure 1A:
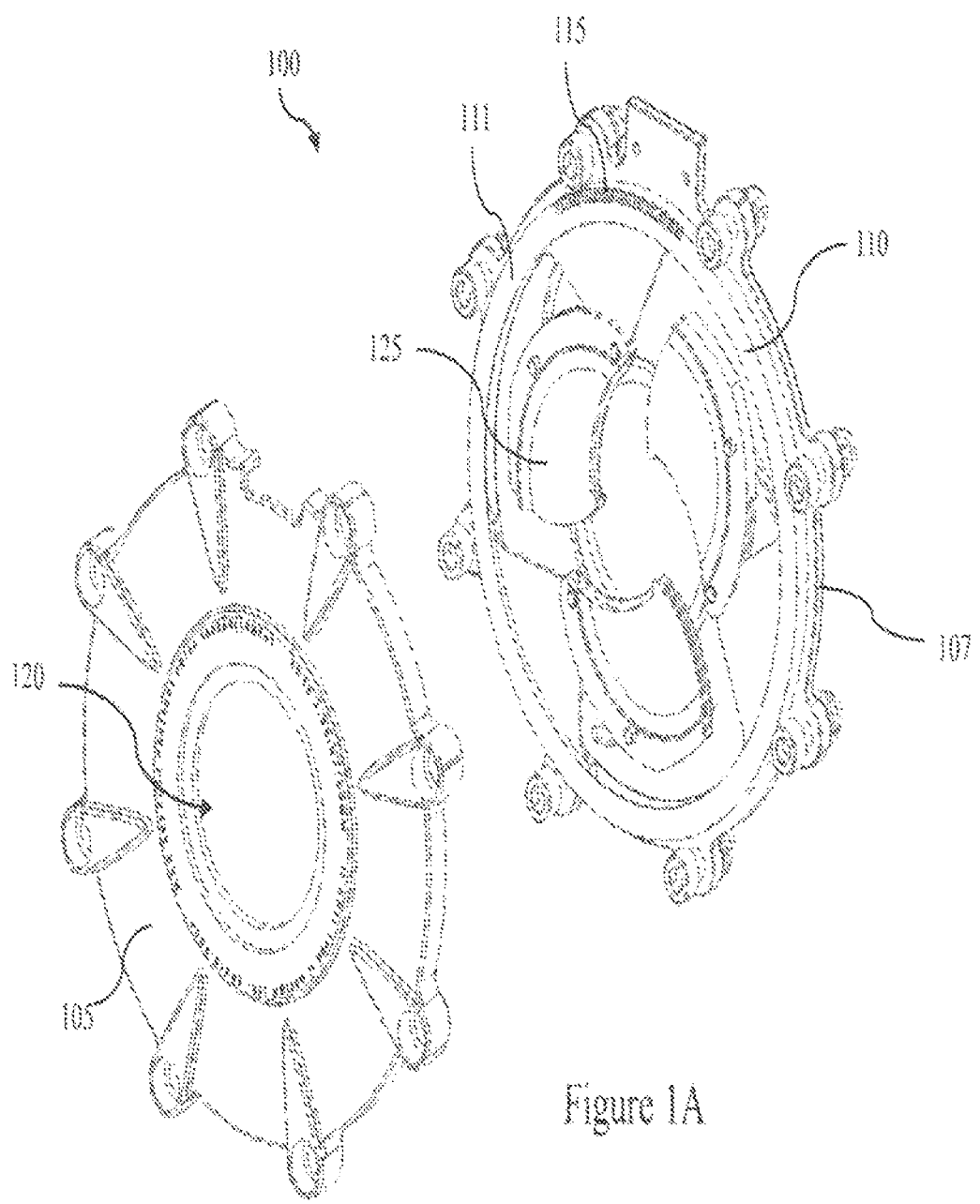
FIG. 1A is an exploded perspective view of the shutter valve, in accordance with one embodiment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

The disclosed embodiments solve problems with the prior art by providing a simplified shutter valve that allows for pressure regulation and for controlling the amount of fluid flow through the valve by regulating the aperture through which said fluid may flow. The disclosed embodiments further improve over the prior art by providing a system that allows for adjusting the lumen through which fluid flows. This allows a user to choose a desired size of the lumen, so as to regulate pressure and fluid flow through the valve. The disclosed embodiments further improve over the prior art by providing a system that allows for closure of the valve by progressively making the lumen through which fluid flows smaller until there is no aperture for allowing fluid flow, thereby eliminating a steep pressure drop, shockwaves in the system and cavitation. The disclosed embodiments also improve over the prior art by providing the ability to remain securely sealed throughout various types of processes, including compression and combustion. The disclosed embodiments further improve over the prior art by allowing the fluid to pass through the valve unobstructed when in the open position.

FIG. 1A is an exploded perspective view of the fully assembled shutter valve 100, in accordance with one embodiment of the present invention. The shutter valve includes a housing or casing having a first part 105 and a second part 107, which are more specifically described in FIGS. 1B and 1C below. The housing further defines a central aperture 120. When mated together, the parts of the housing 105, 107 define am internal cavity and cover that hold an actuator ring 110 (which is more fully described in FIG. 2) and obturator elements 125 (described more fully herein). The actuator ring 110 comprises a plurality of gear teeth 115. The gear teeth 115 are driven by a mating spur (not shown) or any other means of generating rotational energy to cause the actuator ring to translate or rotate within the housing of the shutter valve 100. Additionally, in other embodiments (not shown), the actuator ring can be driven by an appropriate means such as gears, belts, a shaft or some other apparatus to generate rotational energy required to move the shutter valve. Actuator 110 also includes a flat surface 11 that mates with a seal, such that when part 105 of the housing is mated with part 107, a seal is included between the parts 105, 107 to seal the interior cavity created by housing 105, 107.

Figure 3A:
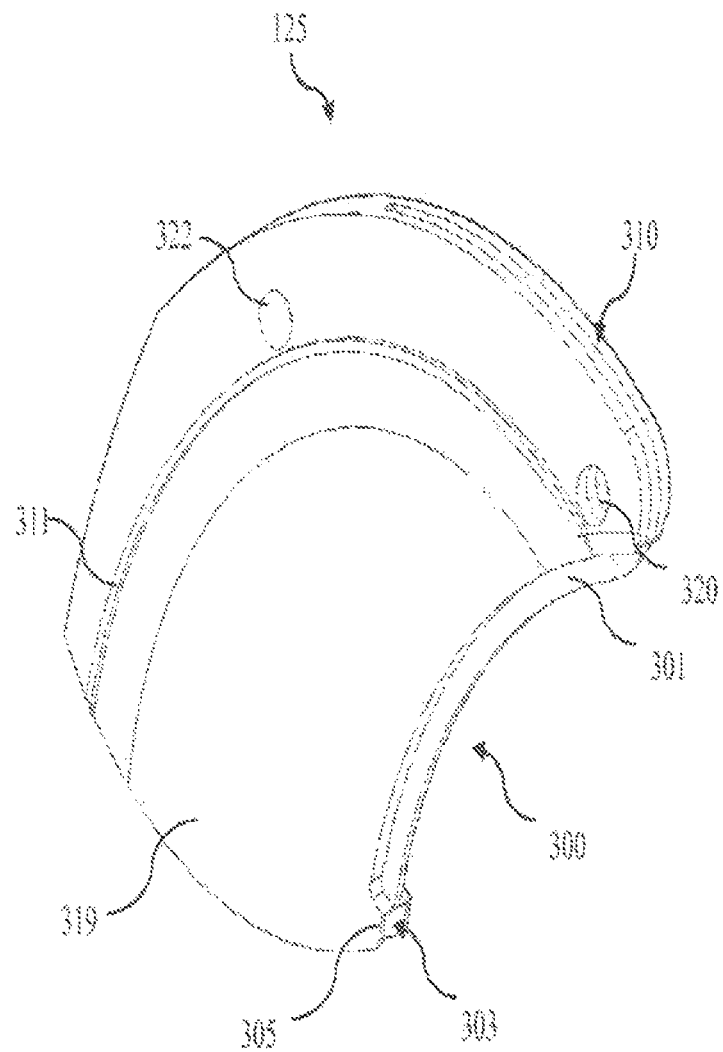
FIG. 3A is a perspective view of an obturator element of the shutter valve, in accordance with one embodiment.
Figure 3B:
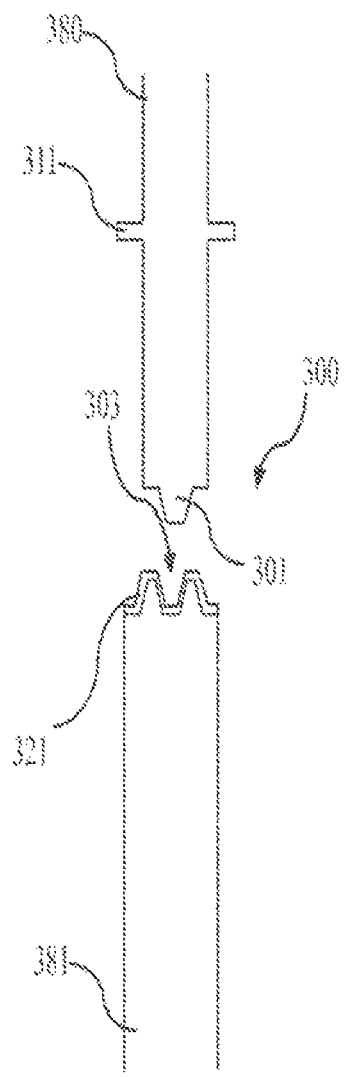
FIG. 3B is a cross-sectional view of mating obturator elements of the shutter valve, in accordance with one embodiment.

Pivotally coupled to the actuator ring 110 are three obturator elements 125 (which more fully described in FIGS. 3A-3B). However, more obturator elements may be used and three (3) is not meant to be a limitation. Additionally, in other embodiments (not shown), the actuator ring can be driven by an appropriate means such as gears, belts, a shaft or some other apparatus to generate rotational energy required to move the actuator ring, and, by extension, the obturator elements. An obturator element is an element that is introduced into an opening (in this case, the lumen 120 of the shutter valve 100). FIG. 1A illustrates the shutter valve in a partially open position, in that the obturator elements 125 are partially rotated so as to partially introduced into the lumen 120.

FIG. 1B is a perspective view of the first part 105 of the housing of the shutter valve 100, in accordance with one embodiment. The first part 105 defines a substantially flat circular body having a substantially flat surface 140 surrounded by a rim or lip 145. The rim or lip protrudes substantially outward from, or substantially perpendicular to, the surface 140 of the first part 105. The rim surrounding the flat surface defines a cavity for holding the actuator ring. The rim may be integral with the flat surface (such as integrally formed) or the flat surface and rim may be manufactured separately and then coupled together. Along the edge of the rim is a plurality of screw or bolt bosses 150 having apertures 155 for receiving screws or bolts for joining or coupling the first part 105 with the second part 107 of the housing. Along the surface 140 are elongated tracks 135 that extend radially from the central aperture 120, wherein each track corresponds to each individual obturator element pin or protrusion (described more fully below). In the present embodiment, each track is an elongated curved shaped groove or slot. The purpose of the tracks 135 are to guide the movement of the obturator elements 125 when they move within the housing 105, 107. Alternative to a track, a protruding wall or parapet may be used.

The surface of the body of the first part 105 further comprises an aperture that is centrally located thereon defining the central aperture 120. O-rings may be inserted into circular shaped grooves 170 that abut the inside of the rim and into circular shaped grooves 160 that surround the central aperture. The rim may also include a slot 175 which is adapted to allow a gear or other driving mechanism to mate with the gear teeth of the actuator ring.

Figure 1C:
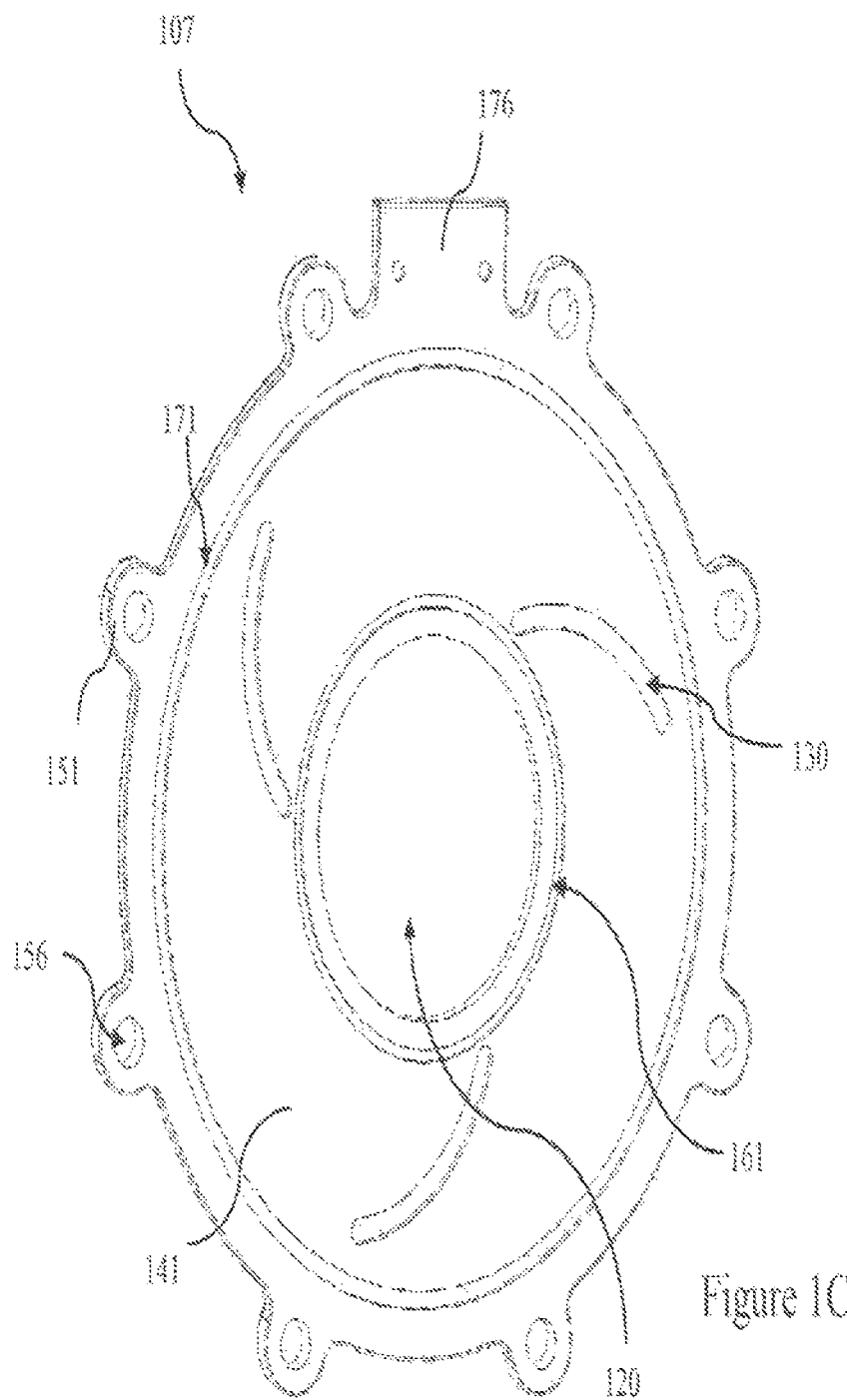
FIG. 1C is a perspective view of the second part of the shutter valve housing, in accordance with one embodiment.

FIG. 1C is a perspective view of the second part 107 of the housing of the shutter valve 100, in accordance with one embodiment. The second part is designed to mate with or cover the first part 105 of the housing, thereby defining a cavity for the actuator ring 110 and obturator elements 125. The second part 107 also defines a substantially flat circular body having a flat surface 141. Along the edge of the flat surface 141 is a plurality of screw or bolt bosses 151 having apertures 156 for receiving screws, bolts or other fasteners for joining or coupling the first part 105 with the second part 107. Along the surface 141 are elongated tracks 130 that extend radially from the central aperture 120. Each of the tracks 130 correspond and align with each track 135 from the first part 105 of the housing. In the present embodiment, each track defines an elongated curved groove or slot. The purpose of the tracks 130 are to guide the movement of the obturator elements 125 when they move within the housing 105, 107. Alternative to a track, a protruding wall or parapet may be used.

The surface of the body of the second part 107 further comprises an aperture that is centrally located thereon defining central aperture 120. O-rings may be inserted into grooves 161 surrounding the central aperture 120 as well as a circular shaped groove 171 proximate to and inside from the edge of the surface 141. The rim of the second part 107 may also include a tab 176 which is sized to couple the valve to a driving mechanism such as a gearbox housing. The housing parts 105 and 107 may be formed from metal, aluminum, plastic or any other material suitable and known to those in the art.

Figure 2:
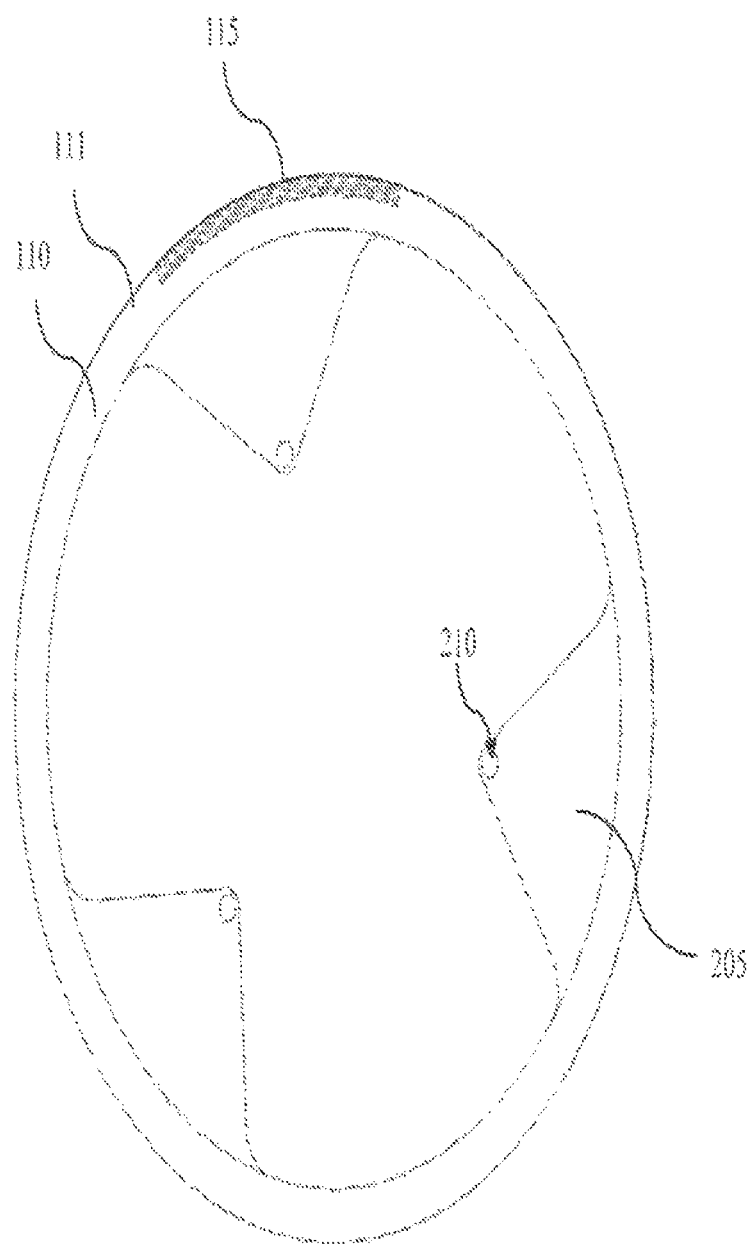
FIG. 2 is a front view of an actuator ring of the shutter valve, in accordance with one embodiment.

FIG. 2 is a front view of the actuator ring 110, in accordance with one embodiment of the present invention. The actuator ring defines a substantially circular shaped ring having a flat top surface opposing a flat bottom surface and a flat side wall. Additionally, the surfaces of the actuator ring forms a seal surface having a flat texture. The sealing surface must be manufactured with high precision so that it forms a seal with other components of the shutter valve. The actuator ring may be formed from aluminum, titanium, steel, or any other alloy material suitable and known to those skilled in the art. Additionally, the actuator ring may also include sealing services comprising of rubber, plastic, PTFE, vinyl, etc. The actuator ring is sized to fit inside the cavity defined by housing (105, 107) of the shutter valve 107.

The actuator ring 110 includes at least three obturator pin bosses 205 affixed within an inside circumference of the actuator ring. The inside circumference is defined by the inner sidewall of the actuator ring. In the present embodiment, each obturator pin boss defines a substantially triangular shaped protrusion extending radially inward from the inside side wall of the actuator ring. Near an apex of each obturator pin boss is a hinge pin aperture 210. Each hinge pin aperture 210 is adapted to receive a pin or other fastener that allows each obturator element to be hingedly connected or to have a hinged connection to each obturator pin boss 205. Each obturator pin boss is sized to be received by the slot 310 of each obturator element, and as more specifically explained in FIGS. 3A through 4.

The actuator ring 110 further includes a plurality of gear teeth 115. As shown in FIG. 2, the gear teeth 115 are positioned such that the gear teeth can be mated with a spur gear (not shown). A spur gear is gear wheel with teeth projecting parallel to the wheel's axis. The spur gear, or any other means of generating rotational energy to cause the actuator ring to translate or rotate within the housing (105, 107) of the shutter valve 100 may be used. For example, in another embodiment (not shown), a protruding element extending radially outward from the surface of the actuator ring connected to a gear shaft may be used to rotate the actuator ring. Actuator 110 also includes a flat surface 11 that mates with a seal, such that when part 105 of the housing is mated with part 107, a seal is included between the parts 105, 107 to seal the interior cavity created by housing 105, 107.

FIGS. 5 and 6 are frontal views of the assembled shutter valve without the first part 105 of the housing, shown in the closed and open position, respectively, in accordance with one embodiment. FIG. 5 is a front view of the shutter valve 100, showing all obturator elements 125 in a closed position. FIG. 6 shows that in the open position, the obturator elements 125 are retracted such that no portion of it is located within the lumen 120. In the closed position (FIG. 5), the obturator elements 125 are extended such that a substantial portion of it is located within the lumen 120. When all obturator elements are in the closed position, the lumen 120 is completely occluded such that no fluid flow is allowed through the valve 100 (FIG. 6). To move from the open position to the closed position, the actuator ring 110 rotates counterclockwise such that the obturator elements 125 rotate counterclockwise about the hinged connection 210. To move from the closed position to the open position, the actuator ring 110 rotates clockwise such that the obturator elements 125 rotate clockwise about the hinged connection 210. The rotation of actuator 110 is apparent in FIGS. 5-6, since the location of the gear teeth 115 has shifted between the two drawings.

FIG. 3A is a perspective view of an obturator element 125 of the shutter valve, in accordance with one embodiment. Each obturator element defines a petal shaped structure having an outside circumference defined by multiple sides. In one embodiment, each of the obturator elements are equally sized and shaped, but this is not meant to be a limitation. Each obturator element further defines a tongue and groove feature 300 along at least a portion of the outside circumference of the petal shape structure. In the present embodiment, the tongue and groove feature comprises two (2) sides of the circumference of the obturator element 125, but this is not meant to be a limitation. On one side of the circumference, a tongue 301 of the tongue and groove feature 300 is located. The tongue can be a ridge protruding from the surface of the petal shaped structure that is adapted to fit into the groove 303 of an adjacent obturator element. On a second side of the circumference, a tongue groove 303 of the tongue and groove feature 300 is located. The groove is a channel defined by two opposing sidewalls, wherein the groove is designed to accept the tongue 301 of an adjacent obturator element (when the valve 100 is in the closed position) so as to create a seal. The tongue and groove feature further comprises a seal surface comprising of rubber, plastic, PTFE, vinyl, any combination thereof etc. The tongue and groove element and seal surface is adapted to create a seal between the obturator elements. The obturator element can be manufactured from steel, aluminum, titanium, any combination thereof or any other material known to those skilled in the art.

Figure 4:
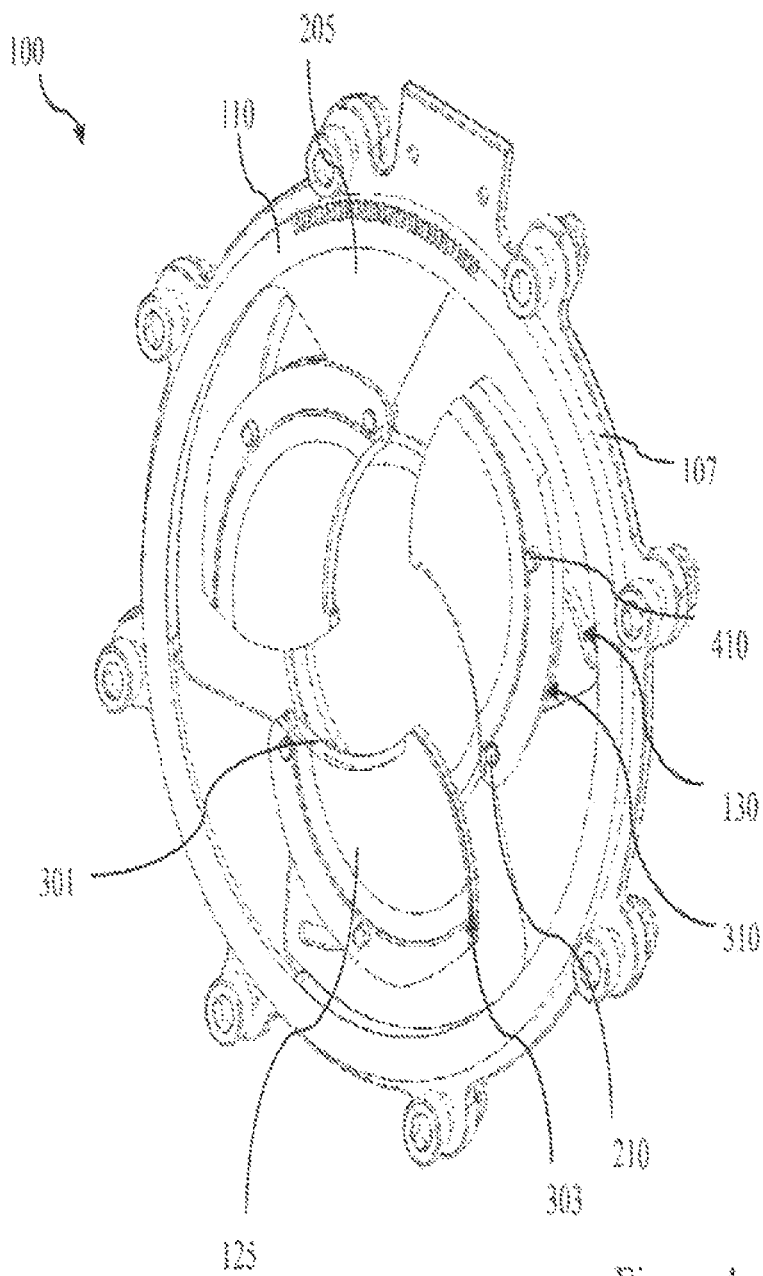
FIG. 4 is a perspective view of the assembled shutter valve without the first part of the housing, in accordance with one embodiment.

Each obturator element further defines a slot 310 on a third side of the outside circumference, which is sized and adapted to receive a corresponding obturator pin boss 205, as each obturator element is pivotally attached to the actuator ring within the shutter valve (more fully described in FIG. 4).

The petal shape structure of each obturator element further defines a hook element 305 located at an apex of the petal shape structure. The hook element defines a hook or beak shape of the petal structure and is adapted to mate with the hook elements of other obturator elements when the valve is in a closed position. See FIG. 5, which shows all obturator elements 125 in the closed position, and the hook features of all obturator elements mating with each other to completely occlude the lumen 120 and eliminating fluid flow through the lumen 120.

FIG. 3A also shows that the obturator element 125 also includes an aperture 320 designed for insertion of a shaft or pin that also extends into a hinge pin aperture 210 in a pin boss 205 of actuator ring 110, thereby creating a hinge, so as to hingably couple the obturator element to the actuator ring. In one embodiment, the pin is secured to the aperture 320 (so that the pin does not rotate within aperture 320), though the pin rotates within the hinge in aperture 210, when the obturator element 125 rotates. FIG. 3A further shows that the obturator element 125 also includes an aperture 322 designed for insertion of a protrusion (such as a shaft or pin) that also extends into a track 130, 135 of housing parts 105, 107, such that the protrusion may glide within said tracks when the obturator element moves within the housing 105, 107. The purpose of the tracks 130, 135 are to guide the movement of the obturator elements 125 when they move within the housing 105, 107. In one embodiment, the pin is secured to the aperture 322 (so that the pin does not rotate within aperture 322), and the pin may glide or travel within tracks 130, 135, when the obturator element 125 rotates.

FIG. 3A also shows a sidewall 311 that comprises an elongated, curved wall having a diminutive height and a flat top surface. The sidewall 311 extends radially in a curved shape from one end of the obturator element 125, starting at or near the aperture 320, and ending at the opposite end of the obturator element, at or near the side what include the groove 303. The purpose of the sidewall 311 is to offset the primary surface 319 of the obturator element from the surface 140 or 141 of the first and second parts of the housing 105, 107. When the obturator element is placed in the first and second parts of the housing, the sidewall 311 may contact, or nearly contact, the surface of the first and second parts of the housing. This offsets the primary surface of the obturator element from the surface 140 or 141 such that the primary surface does not contact said surfaces 140, 141. Further, as the obturator element rotates, the sidewall 311 may contact, or nearly contact, the surface of the first and second parts of the housing, such that the primary surface need not contacts surfaces 140, 141. This reduces the surface areas that produce friction, thereby increasing the efficiency of the system. Note there is a sidewall 311 on the both sides of the obturator element (second sidewall not shown in FIG. 3A).

FIG. 3B is a cross-sectional view of two mating obturator elements of the shutter valve 100, in accordance with one embodiment. FIG. 3B shows that each obturator element defines a tongue and groove feature 300 along at least a portion of the outside circumference of the petal shape structure. In the top obturator element 380, a tongue 301 of the tongue and groove feature 300 is located. The tongue can be a ridge protruding from the surface of the petal shaped structure that is adapted to fit into the groove 303 of an adjacent obturator element 381. The groove 303 is a channel defined by two opposing sidewalls, wherein the groove is designed to accept the tongue 301 of the adjacent obturator element 380 (when the valve 100 is in the closed position see FIG. 5) so as to create a seal. The tongue and groove feature 300 further comprises a seal surface 321 comprising of rubber, plastic, PTFE, vinyl, any combination thereof etc. The tongue and groove element and seal surface is adapted to create a seal between the obturator elements 380, 381. FIG. 3B also shows a cross-section of sidewall 311. Note there is a sidewall 311 on the both sides of the obturator element (both sidewalls shown in FIG. 3B).

FIG. 4 is a perspective view of the shutter valve 100 with the first part 105 of the housing removed, in accordance with one embodiment of the present invention. In the present embodiment, FIG. 4 illustrates three obturator elements 125 hingedly coupled to an obturator pin boss 205 such that the obturator elements are arranged in a circular array around the inside circumference of the actuator ring 110. FIG. 4 illustrates the shutter valve 100 in a partially open position, such that the obturator elements only partially occlude lumen 120. Each of the obturator elements are movably or hingedly attached to the obturator pin boss by a fastener at the hinge pin aperture. In one embodiment, the fastener can be a pin that extends through aperture 320 of the obturator element 125 and the hinge pin aperture 210 of actuator ring 110, or other means of allowing pivoting movement.

FIG. 4 also illustrates how the slot 130 of each obturator element is adapted and sized to receive the obturator pin boss 205. A protruding element 410 (located in the aperture 322 of each obturator element) is received by each of the plurality of tracks 130. The protruding element is sized such that it can be inserted into the tracks and glide along the tracks as the obturator elements move between the open and closed position. The protruding element can be integrally formed with the each obturator element or it can be coupled or affixed to the aperture 322 of each obturator element separately.

As mentioned above, the tracks define an elongated curved groove along the flat surface 141 of the second part 107 of the housing. It should be noted that FIG. 4 does not include the first part 105, which in the final full assembly holds the actuator ring and obturator elements and is covered by the second part 107. The protruding element or protrusions 410 also is received by a plurality of tracks 135 on the surface of the first part 105 of the housing. The tracks on the first and second parts of the housing define a shape that allow the protrusions 410 to glide along the track when the shutter valve moves between the open and closed positions.

In the present embodiment, three obturator elements are communally disposable between an open position and a closed position. In the fully open position, each of the plurality of the obturator elements are positioned such that the central opening 120 is not obstructed allowing fluids, gases or bodies to flow through the opening. As forces act tangential to the actuator ring, the actuator ring 110 rotates within the housing causing each of the obturator elements hingedly attached to the obturator pin boss at the obturator pin aperture by a pin to pivot causing the protruding element 410 to slide or glide along the tracks 130, 135. The obturator elements 125 will continue to slide along the tracks 130, 135 until each of the obturator element contacts an adjacent obturator element so as to securely void any aperture within the inside circumference of the actuator ring. When in the fully closed position, the tongue 301 of each tongue and groove element 300 of each obturator element mates with the groove 303 of an adjacent obturator element. Additionally, each hook element 305 of each obturator element contacts with the hook element of an adjacent obturator element forming a seal.

To open the shutter valve from a closed position, tangential forces (opposite to those applied for closing the shutter valve) are applied to the actuator ring 110 such that the actuator ring is rotated within the housing. This causes the actuator ring to rotate, thereby causing the obturator pin boss to pivot the obturator element, which causes the protruding element 410 to slide or glide along the track 130 such that the tongue and groove element of each obturator element separates from the adjacent obturator element. As mentioned above, when in the fully open position, the central aperture 120 is not blocked by any portion of the obturator elements. The shutter valve can be positioned in a partially open or partially close position for regulating pressure and for controlling fluid flow. Additionally, additional gaskets, O-rings or seals may also be utilized to accomplish a fluid tight seal if required.

I claim:

1. A shutter valve for regulating pressure and controlling fluid flow, comprising:

a plurality of obturator pin bosses, each obturator pin boss of the plurality of obturator pin bosses affixed within a housing, and each obturator pin boss further comprising a hinge pin aperture;

three or more obturator elements, each obturator element of the three or more obturator elements defining a petal shape structure including a tongue and groove feature along at least a portion of an outside circumference thereof, wherein the tongue and groove feature includes a ridge on a first side of the portion of the outside circumference and a channel on a second side of the portion of the outside circumference, and wherein each obturator element is hingedly coupled to the hinge pin aperture of the obturator pin boss; and a hook element located at an apex of said petal shape structure of each obturator element.

2. The shutter valve of claim 1, wherein the petal shape structure of each obturator element further comprises a seal surface along at least the portion of the outside circumference thereof.

3. The shutter valve of claim 2, wherein said seal surface is composed of any one of rubber, plastic, PTFE, and vinyl.

4. The shutter valve of claim 1, wherein the shutter valve further comprises an actuator ring held within a cavity defined by the housing, the actuator ring comprising a flat surface to mate with a seal.

5. The shutter valve of claim 4, wherein each of said three or more obturator elements is coupled by a hinge to the hinge aperture of the obturator pin boss such that said three or more obturator elements are arranged in a circular array along the inside circumference of the actuator ring.

6. The shutter valve of claim 1, wherein said three or more obturator elements are communally disposable between an open position and a closed position.

7. The shutter valve of claim 6, wherein in the closed position a seal surface of each obturator element contacts an adjacent obturator element so as to occlude any aperture between each obturator element and the adjacent obturator element.

8. The shutter valve of claim 1, wherein:
the shutter valve further comprises an actuator ring held within a cavity defined by the housing, the actuator ring comprising a plurality of gear teeth, the gear teeth driven by a mating gear; and
forces acting on the gear teeth drive the actuator ring, causing the obturator elements to move between opened and closed positions.

9. A shutter valve for regulating pressure and controlling fluid flow, comprising:
a plurality of obturator pin bosses, each obturator pin boss of the plurality of obturator pin bosses affixed within a housing;
a hinge pin aperture located in each obturator pin boss; and
three or more obturator elements, each obturator element of the three or more obturator elements comprising:
i) a petal shape structure including a tongue and groove feature along at least a portion of an outside circumference thereof, wherein the tongue and groove feature includes a ridge on a first side of the portion of the outside circumference and a channel on a second side of the portion of the outside circumference; and
ii) a hinged connection to the hinge pin aperture of the obturator pin boss.

10. The shutter valve of claim 9, wherein the petal shape structure of each obturator element further comprises a seal surface along at least the portion of the outside circumference thereof.

11. The shutter valve of claim 10, wherein said seal surface is composed of any one of rubber, plastic, PTFE, and vinyl.

12. The shutter valve of claim 9, wherein:
the shutter valve further comprises an actuator ring within the housing; and
said actuator ring comprises a flat surface to mate with a seal.

13. The shutter valve of claim 9, wherein said three or more obturator elements are arranged in a circular array.

14. The shutter valve of claim 9, wherein said three or more obturator elements are communally disposable between an open position and a closed position.

15. The shutter valve of claim 14, wherein, in the closed position, a seal surface of each obturator element contacts an adjacent obturator element so as to occlude any aperture between each obturator element and the adjacent obturator element.

16. A shutter valve for regulating pressure and controlling fluid flow, comprising:
a) a plurality of obturator pin bosses, each obturator pin boss of the plurality of obturator pin bosses affixed within an inside circumference of an actuator ring; and
b) a hinge pin aperture located in each obturator pin boss; three or more obturator elements, each obturator element of the three or more obturator elements comprising:
i) a petal shape structure including a tongue and groove feature along at least a portion of an outside circumference thereof, wherein the tongue and groove feature includes a ridge on a first side of the portion of the outside circumference and a channel on a second side of the portion of the outside circumference;
ii) a hinged connection to the hinge pin aperture of the obturator pin boss, such that rotational movement of the actuator ring causes movement of the obturator elements; and
iii) a protrusion configured for gliding along a track.

17. The shutter valve of claim 16, wherein the petal shape structure of each obturator element further comprises a seal surface along at least the portion of the outside circumference thereof.

18. The shutter valve of claim 17, wherein said actuator ring comprises a flat surface to mate with a seal.

19. The shutter valve of claim 18, wherein said three or more obturator elements are communally disposable between an open position and a closed position.

20. The shutter valve of claim 16, the shutter valve further comprising a hook element located at an apex of said petal shape structure.

* * * * *